March 25, 1969     T. J. HARRIS ET AL     3,434,778

RADIATION BEAM DEFLECTION SYSTEM

Filed June 7, 1965

INVENTORS
THOMAS J. HARRIS
HAROLD FLEISHER
EUGENE SHAPIRO

BY *Ralph C. Lustin*

ATTORNEY

United States Patent Office 3,434,778
Patented Mar. 25, 1969

3,434,778
RADIATION BEAM DEFLECTION SYSTEM
Thomas J. Harris, Harold Fleisher, and Eugene Shapiro, Poughkeepsie, N.Y., assignors to International Business Machines Corporation, Armonk, N.Y., a corporation of New York
Filed June 7, 1965, Ser. No. 461,757
Int. Cl. G02f 1/28; G02b 17/00; H01j 15/00
U.S. Cl. 350—160         3 Claims

ABSTRACT OF THE DISCLOSURE

Apparatus for deflecting an intense electromagnetic radiation beam is provided. A dense magnetoplasma is provided through which the beam is passed as a magnetic field is applied to the plasma. The angular position of the beam is altered by varying the strength of the magnetic field. An adjustable electromagnet establishes the magnetic field of desired intensity between its pole faces. An ionizable gas is located in a container between the pole faces of the magnet and the gas is excited while the radiation beam is passed through the container.

---

This invention relates to a method and apparatus for deflecting an intense radiation beam, and more particularly to the use of a dense magnetoplasma for effecting an angular deflection of a beam emitted by a microwave, millimeter or optical maser.

It is well known that a plasma, when sufficiently dense and immersed in a magnetic field of sufficient strength, has a dispersion characteristic for electromagnetic waves that are propagated along the magnetic field in the plasma. A variation in the strength of the magnetic field may be used to vary the refractive index of the plasma since the dispersion characteristic is a function of the magnetic field. Consequently, if the incident beam of radiation is (a) monochromatic and collimated, (b) the frequency of the incident radiation is above the plasma frequency but within the dispersion characteristic and (c) the beam is a "small signal" perturbation on the plasma, the phase velocity of the wavefront within the plasma will be less than outside the plasma. The amount by which the phase velocity within the plasma is less than that outside is a function of the magnetic field strength which is controllable. Since the internal velocity is controllable, the index of refraction is controllable and controlled angular deflection may be accomplished.

An object of this invention is to provide improved means for varying the angular position of a beam of electromagnetic radiation.

Another object is to provide a dense magnetoplasma through which a beam of magnetic radiation is passed while a magnetic field is subjected on the plasma, and having means for varying the strength of the magnetic field to change the angular position of the beam.

In a beam deflection system using ordinary electro-optic devices, an absorption of electromagnetic energy may be sufficient to heat the devices to a point where their usefulness is lost. The temperature of the plasma in the proposed system is so high that the incident beam of high energy radiation will not disturb it sufficiently to affect its physical characteristics. It is, therefore, another object of the invention to provide apparatus for deflecting a beam of electromagnetic energy without being affected by absorption of electromagnetic energy.

The foregoing and other objects, features and advantages of the present invention wil be apparent from the following more particular description of the preferred embodiment of the invention as illustrated in the accompanying drawings.

Figure 1:
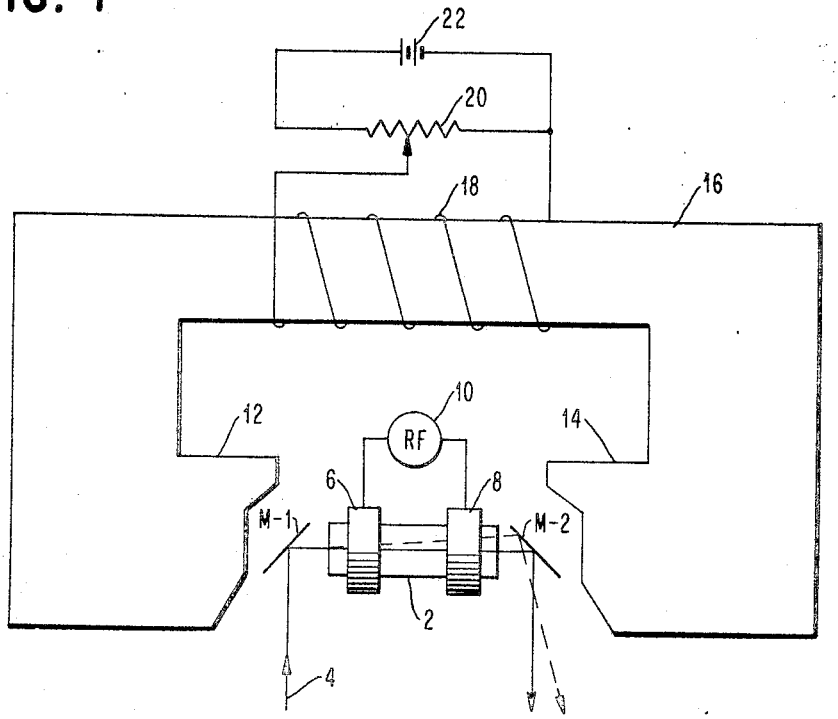
Figure 2:
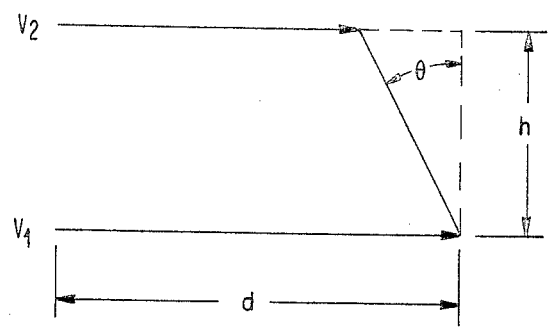
Figure 3:
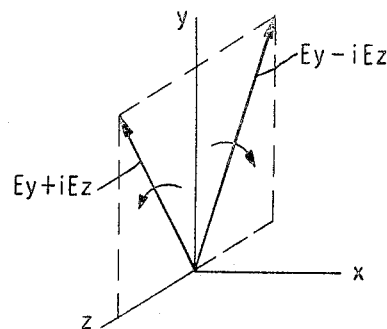

In the drawings:
FIG. 1 is a schematic diagram of apparatus for deflecting a beam of radiation by passing it through a plasma immersed in a magnetic field.
FIG. 2 is a diagram indicating the beam deflection taking place in the plasma due to the difference in velocity of a wavefront between its top and bottom edges.
FIG. 3 is a diagram indicating the composition of the radiation beam and its direction of propagation.

Referring to FIG. 1 of the drawings, it will be noted that there is shown a cylindrical container 2 of glass or quartz, for example, in which a readily ionizable gas such as He, Argon, Kr or Xe is sealed under pressure from .1 mm. to several mm. of mercury. The ends of the container are transparent so that a beam of radiation may be passed longitudinally through it and the gas contained therein. At the ends of the container are mirrors M–1 and M–2, the mirror M–1 being arranged at an angle to receive a monochromatic, collimated and circularly polarized radiation beam 4, emitted by a microwave, millimeter or optical source, and direct it through the container to the mirror M–2 from which it is reflected to some point of use, not shown. Surrounding the container adjacent its ends are rings 6 and 8 connecting to opposite sides of an RF generator 10 which is operable to excite the ionized gas or plasma in the container 2. In axial alignment with the container 2 are the pole portions 12 and 14 of an electromagnet 16. The faces of the pole portions are shaped generally as shown to provide a magnetic field with a constant gradient between the upper and lower surfaces of the container 2. A winding 18 on the electromagnet 16 is subjected to a variable voltage through an adjustable contact on a resistor 20 connected across a voltage supply 22 for varying the magnetic field between the pole portions 12 and 14.

When a plasma or ionized gas exists in the container 2 by reason of a magnetic field established between the pole portions 12 and 14, there is present a ternary mixture containing $n_e$ electrons per cm.$^3$, $n_i$ ions per cm.$^3$ and N molecules per cm.$^3$. The state of equilibrium of the ionized gas is characterized by three quantities:

the degree of ionization $\alpha$ $$\alpha = n/n + N$$

the density of charge carriers $n$ $$n = n_i = n_e$$

and the absolute temperature T.

In a true thermodynamic equilibrium, the three variables $\alpha$, $n$ and T are not independent. The ionization is determined by the density and the temperature. The gas is said to be in an equilibrium state of thermal ionization.

In numerous cases, however, the ionization is due to an external electric field and the gas is not in thermal equilibrium. It will often attain a steady state which can be characterized by the following parameters: $\alpha$, $n$, $T_e$ (temperature of electrons), $T_i$ (temperature of ions) and $T_o$ (temperature of the molecules). If the electric field is suppressed, the above three temperatures tend toward the same value in a very short time but $\alpha$ retains its value for a comparatively long time. The degree of ionization $\alpha$ varies in practice from very small values of the order of $10^{-10}$ in gaseous discharges of weak intensity, to 1.

A plasma of strong intensity can be used to control the angular deflection of the intense radiation beam. The principle of operation is based on the dispersion characteristics for electromagnetic waves that are propagated in a plasma immersed in a magnetic field. Consider the situation in which the direction of propagation is parallel to the magnetic field. If the wave is assumed to be plane polarized initially, the plane of polarization is rotated after passage through the plasma. The analysis is simpler if it is assumed that the beam is composed of circularly polarized waves $Ey+iEz$ and $Ey-iEz$ of FIG. 3, and the direction of propagation is parallel to the X axis. The velocity dispersion relation for these two components is:

$$V^2 = c^2/1 - \omega_p^2/\omega^2(1/1 \pm \omega_{ce}/\omega)$$

where the plasma frequency $\omega_p$ is defined as $$\omega_p = 5.64 \times 10^4 (n_e)^{1/2}$$

and $\omega_{ce}$ is the electron "cyclotron frequency" defined as $\omega_{ce} = 1.76 \times 10^7 B$ where B is the field intensity in oersteds.

The minus sign in the denominator applies if the electric vector rotates in the same sense as the electrons gyrate. This will be called the "extraordinary wave." For the "ordinary wave" the electric vector rotates in the opposite sense, and the plus sign must be taken.

The actual deflection in the plasma when employing the apparatus of FIG. 1 takes place due to the fact that each point on the wavefront travels at a different velocity. This is illustrated in FIG. 2 where the top of the wave travels at a velocity $V_2$ and the bottom of the wave travels at a velocity $V_1$. With the velocity $V_1$ being greater than $V_2$, then the wave will be deflected through the angle $\theta$ after passage through $d$ centimeters of plasma.

$$V_1 t_1 = d$$
$$V_2 t_1 = d - \Delta d$$
$$\frac{V_2}{V_1} = 1 - \frac{\Delta d}{d}$$

therefore $$\Delta d = \left(1 - \frac{V_2}{V_1}\right) d$$

The deflection angle $$\theta = \frac{\Delta d}{n} = \Delta d$$

if the field gradient is in oersteds/cm.

Assuming a magnetic field gradient of 20,000 oersteds/cm. with a variation from 30,000 to 10,000 oersteds, an electron density $n_e$ of $\sqrt{10} \times 10^{16}$ electrons/cm.$^3$, and radiation with a wavelength of 100$\mu$, the corresponding angular velocities are:

$$\omega_p = 5.64 \times 10^4 \sqrt{n_e} = 10^{13}$$
$$\omega_{ce1} = 5.28 \times 10^{11}$$
$$\omega_{ce2} = 1.76 \times 10^{11}$$
$$\omega = 1.88 \times 10^{13}$$

$$V_1^2 = \frac{c^2}{1 - \left(\frac{10^{13}}{1.88 \times 10^{13}}\right)^2 \frac{1}{1 - \frac{5.28 \times 10^{11}}{1.88 \times 10^{13}}}}$$

$$V_1^2 = \frac{c^2}{.708841}$$

similarly $$\frac{V_2^2}{V_1^2} = \frac{7.08841}{7.14311}$$

$$2 \log \frac{V_2}{V_1} = \log 7.08841 - \log 7.14311$$

$$= .8505482 - .8538867$$

$$= .0033385$$

$$\log \frac{V_2}{V_1} = .0016693$$

$$\frac{V_2}{V_1} = 1.0039$$

$$\Delta d = \left(1 - \frac{V_2}{V_1}\right) d$$

where:

$\Delta d = .0039 d$
$d = 2$ cm.
$\Delta d = .0078$
$\Delta \theta = \Delta d = .0078$ radian
$\Delta \theta = .445$ degree Thus, a beam of radiation can be deflected from zero to .445 degree in two centimeters of plasma. This deflection can be controlled by varying the magnetic field strength or by varying the electron density, or both. Larger deflections can be achieved by using larger magnetic fields, larger gradients and larger electron densities. Solid materials such as bismuth could be used to increase the electron densities. Bismuth exhibits cyclotron frequency phenomena and is transparent to long wavelength radiation.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A radiation beam deflection system comprising, in combination,
    an electromagnet having pole portions presenting laterally spaced pole faces,
    an elongated container arranged between said pole faces and having transparent end walls substantially in axial alignment therewith,
    an ionizable gas sealed within said container,
    adjustable means for establishing a magnetic field of desired intensity between said pole faces,
    means for directing a radiation beam longitudinally through said container,
    means associated with said container for exciting ionized gas contained therein, and
    said pole faces being shaped to provide a field gradient between the upper and lower surfaces of said container.

2. The system of claim 1 in which said means for exciting ionized gas in said container comprises rings surrounding said container adjacent its ends, and an RF generator connected between said rings.

3. The system of claim 1 in which said means for directing a radiation beam through said container comprises mirrors, one arranged at an angle relative to one end of said container for receiving a radiation beam and reflecting it longitudinally through the latter, and another arranged at an angle relative to the other end of said container for receiving said radiation beam from the latter and reflecting it to a point of use.

References Cited

UNITED STATES PATENTS

| | | | |
|---|---|---|---|
| 2,915,943 | 12/1959 | Brown et al. | 350—160 |
| 3,067,420 | 12/1962 | Jones et al. | |
| 3,372,972 | 3/1968 | Schmidt | 350—160 |

DAVID H. RUBIN, *Primary Examiner.*

E. BAUER, *Assistant Examiner.*

U.S. Cl. X.R.

350—175